United States Patent
Iizawa

(10) Patent No.: US 9,250,829 B2
(45) Date of Patent: Feb. 2, 2016

(54) STORAGE SYSTEM AND METHOD FOR MANAGING STORAGE APPARATUSES

(71) Applicant: FUJITSU LIMITED, Kawasaki-shi, Kanagawa (JP)

(72) Inventor: Ken Iizawa, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 82 days.

(21) Appl. No.: 14/167,559

(22) Filed: Jan. 29, 2014

(65) Prior Publication Data

US 2014/0297946 A1 Oct. 2, 2014

(30) Foreign Application Priority Data

Mar. 28, 2013 (JP) .................. 2013-069153

(51) Int. Cl.
  *G06F 12/06* (2006.01)
  *G06F 3/06* (2006.01)
(52) U.S. Cl.
  CPC ............ *G06F 3/0665* (2013.01); *G06F 3/0619* (2013.01); *G06F 3/0689* (2013.01)
(58) Field of Classification Search
  CPC .... G06F 3/0665; G06F 3/0619; G06F 3/0689
  See application file for complete search history.

(56) References Cited

U.S. PATENT DOCUMENTS

| 5,765,200 A * | 6/1998 | McIlvain et al. ...... G06F 3/0622 703/24 |
| 6,038,570 A * | 3/2000 | Hitz et al. ............. G06F 3/0601 |
| 2014/0115238 A1* | 4/2014 | Xi et al. ..................... 711/103 |

FOREIGN PATENT DOCUMENTS

JP   10-293658   11/1998

* cited by examiner

*Primary Examiner* — Kalpit Parikh
(74) *Attorney, Agent, or Firm* — Staas & Halsey LLP

(57) ABSTRACT

A processor of a distribution device included in a storage system is configured to manage an initial write position and a current write position for each of a plurality of storage apparatuses. The initial write position varies for the storage apparatuses. The processor is configured to receive a write request and give an instruction for writing data to each of the storage apparatuses in accordance with the current write position by distributing the write request to each of the storage apparatuses. The processor is configured to manage offset information indicating a write position relative to a top of a storage device corresponding to the current write position for each of the storage apparatuses. The processor is configured to receive a read request and select, based on the offset information, one of the storage apparatuses so as to send the read request to the selected storage apparatus.

8 Claims, 17 Drawing Sheets

FIG. 8

| STORAGE APPARATUS | UNIQUE INFORMATION | |
|---|---|---|
| | WRITE STARTING ADDRESS | OFFSET INFORMATION |
| SA#1 | ADR0 | OFFSET0 |
| SA#2 | ADR1 | OFFSET1 |
| SA#3 | ADR2 | OFFSET2 |

STORAGE SYSTEM AND METHOD FOR MANAGING STORAGE APPARATUSES

CROSS-REFERENCE TO RELATED APPLICATION

This application is based upon and claims the benefit of priority of the prior Japanese Patent Application No. 2013-069153, filed on Mar. 28, 2013, the entire contents of which are incorporated herein by reference.

FIELD

The embodiments discussed herein are related to a storage system and a method for managing storage apparatuses.

BACKGROUND

Storage systems such as distributed storage systems perform mirroring through which replicated data is arranged in a distributed manner in a plurality of storage apparatuses (storage nodes), thereby ensuring availability and reliability of data.

In a client/server type distributed storage system, a proxy server receives a request from a client and forwards the request to a storage apparatus. For example, upon receipt of a write request, the proxy server forwards the write request to all the storage apparatuses. Upon receipt of a read request, the proxy server forwards the read request to any one of the storage apparatuses.

A storage apparatus usually includes a plurality of hard disk drives (HDDs). The write performance decreases if read access to an HDD occurs during write access to the HDD. To address this, a storage apparatus includes a cache memory. The storage apparatus reads data from the cache memory if read access results in a cache hit, whereas the storage apparatus reads data from an HDD if read access results in a cache miss.

Also, a disk array subsystem is known, in which a disk drive to be accessed is selected in the order of priority among disk drives in which data has been mirrored.

A related technique is disclosed in, for example, Japanese Laid-open Patent Publication No. 10-293658.

However, cache memories are expensive. Therefore, a high-cost storage system would be generated if the write performance is improved depending merely on cache memories. Also, there are not necessarily significant differences in the order of preference among disk drives in which data has been mirrored, and therefore control over degradation in the write performance is sometimes limited.

SUMMARY

According to an aspect of the present invention, provided is a storage system including a plurality of storage apparatuses and a distribution device. Each of the plurality of storage apparatuses includes a plurality of storage devices on which data is sequentially recorded in accordance with a write position indicating where the data is to be written. The distribution device is configured to distribute a request to the plurality of storage apparatuses. The distribution device includes a processor. The processor is configured to manage an initial write position and a current write position for each of the plurality of storage apparatuses. The current write position indicates a position where data is to be currently written. The initial write position indicates an initial position of the current write position. The initial write position varies for the plurality of storage apparatuses. The processor is configured to receive a write request and give an instruction for writing data to each of the plurality of storage apparatuses in accordance with the current write position by distributing the write request to each of the plurality of storage apparatuses. The processor is configured to manage offset information indicating a write position relative to a top of a storage device corresponding to the current write position for each of the plurality of storage apparatuses. The processor is configured to receive a read request and select, based on the offset information, one of the plurality of storage apparatuses so as to send the read request to the selected storage apparatus.

The objects and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 is a table listing an example of unique information that is unique to each of the storage apparatuses held by the access distribution device of the second embodiment;

DESCRIPTION OF EMBODIMENTS

Hereinafter, embodiments will be described in detail with reference to the drawings.

First Embodiment

Figure 1:
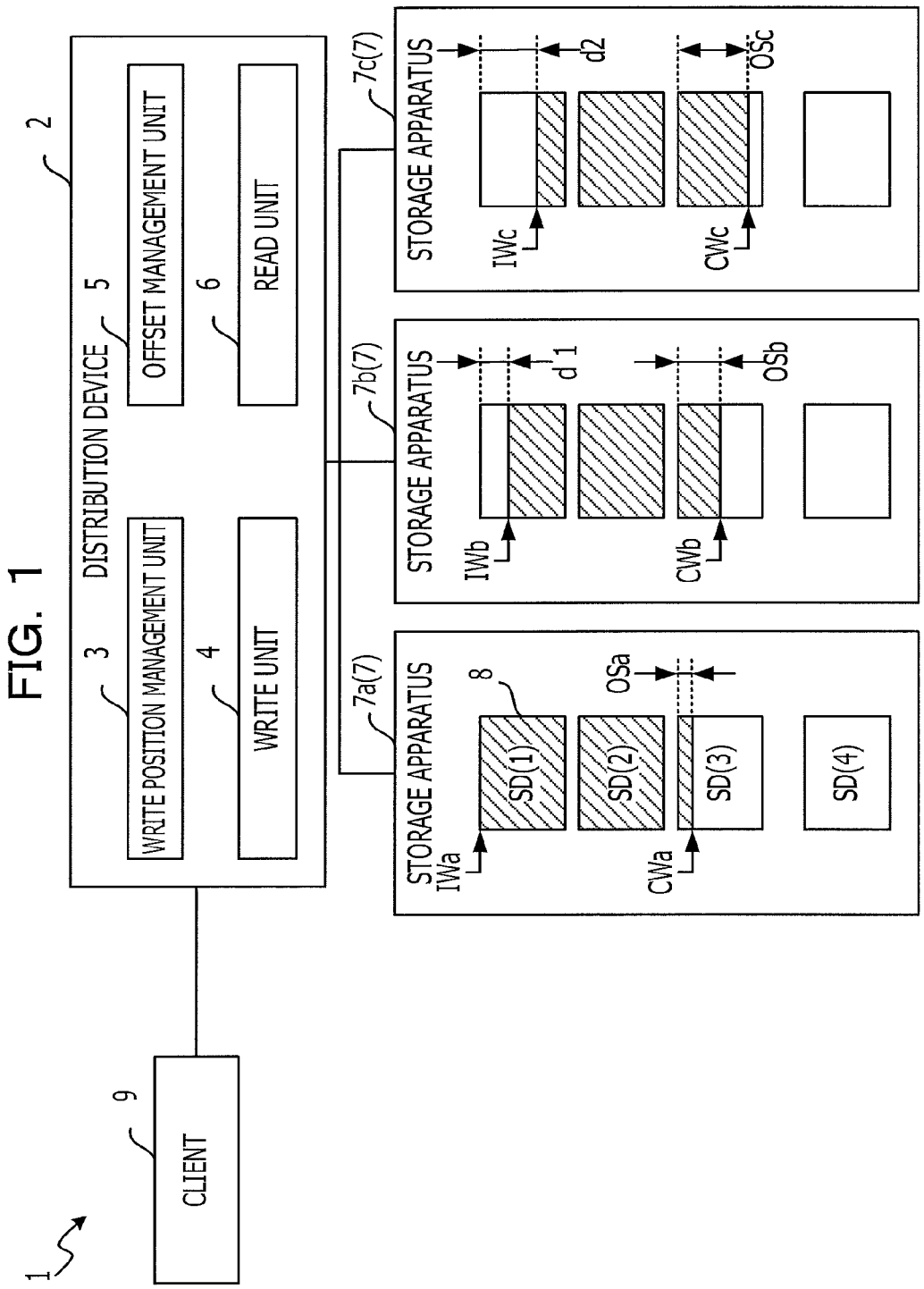
FIG. 1 is a block diagram illustrating an example of a configuration of a storage system of a first embodiment.

First, a storage system of a first embodiment will be described with reference to FIG. 1. FIG. 1 is a block diagram illustrating an example of a configuration of the storage system of the first embodiment.

A storage system 1 is a client/server type distributed storage system. The storage system 1 sequentially records data. For example, the storage system 1 is a storage system that records write-once workloads such as capture of packet communication, or a log-structured file system.

The storage system 1 includes a distribution device 2 and a plurality of storage apparatuses 7 (7a, 7b, 7c). The storage system 1 performs triple mirroring in which the three storage apparatuses 7a, 7b, and 7c hold the same data. Note that although the storage system 1 includes the three storage apparatuses 7a, 7b, and 7c, the storage system 1 may include two storage apparatuses or four or more storage apparatuses 7.

Each storage apparatus 7 includes a plurality of storage devices 8 (SD (1), SD (2), SD (3), SD (4)). Each storage device 8, which is capable of holding data, is an HDD or a solid state drive (SSD: flash memory drive), for example. Note that although each storage apparatus 7 includes four storage devices 8 (SD (1), SD (2), SD (3), SD (4)), each storage apparatus 7 may instead include two, three storage devices 8, or five or more storage devices 8.

The storage devices 8 in each storage apparatus 7 have the same configuration. The three storage apparatuses 7a, 7b, and 7c each include the four storage devices 8 (SD (1), SD (2), SD (3), SD (4)), and all the storage devices 8 have the same storage capacity. Each of the storage apparatuses 7 sequentially records data in accordance with write positions of the four storage devices 8 (SD (1), SD (2), SD (3), SD (4)).

The distribution device 2 is communicably connected to the plurality of storage apparatuses 7. The distribution device 2 is also communicably connected to a client 9. The distribution device 2 receives an access request (for example, a write request, a read request, or another request.) from the client 9. The distribution device 2 forwards the received access request to the storage apparatus 7. For example, upon receipt of a write request from the client 9, the distribution device 2 forwards the write request to all the storage apparatuses 7. Accordingly, the distribution device 2 distributes the write request received from the client 9 to the plurality of storage apparatuses 7.

Also, upon receipt of a read request from the client 9, the distribution device 2 forwards the read request to one of the plurality of storage apparatuses 7. Accordingly, the distribution device 2 distributes the read request received from the client 9 to any of the plurality of storage apparatuses 7.

The distribution device 2 includes a write position management unit 3, a write unit 4, an offset management unit 5, and a read unit 6. The write position management unit 3 manages an initial write position (IW), which is different for each storage apparatus 7, and a current write position (CW) for each storage apparatus 7.

The initial write position (IW) is an initial position of a write position to which data is written. In the storage device 8 (SD (1)) of the storage apparatus 7a, the head address is regarded as the initial write position (IWa). In the storage device 8 (SD (1)) of the storage apparatus 7b, a position that is ahead of the head address by d1 is set as the initial write position (IWb). In the storage device 8 (SD (1)) of the storage apparatus 7c, a position that is ahead of the head address by d2 is set as the initial write position (IWc). Here, it is assumed that d1, d2>0 and d1≠d2.

The current write position (CW) is a current position of writing data. For example, in the example of FIG. 1, the current write position (CWa) of the storage apparatus 7a, the current write position (CWb) of the storage apparatus 7b, and the current write position (CWc) of the storage apparatus 7c are in the storage devices 8 (SD (3)) of the respective storage apparatuses 7.

The write unit 4 receives a write request, and gives an instruction for writing data to the current write position (CW) of each of the storage apparatuses 7 (7a, 7b, 7c) by distributing the write request to each of the storage apparatuses 7 (7a, 7b, 7c) in which data is to be mirrored.

The offset management unit 5 manages, as offset information (OS), a write position relative to the top of the storage device 8 corresponding to the current write position (CW) for each of the storage apparatuses 7 (7a, 7b, 7c). For example, the write positions are managed as offset information (OSa) of the storage apparatus 7a, offset information (OSb) of the storage apparatus 7b, and offset information (OSc) of the storage apparatus 7c. The offset information (OSa, OSb, OSc) differs for each of the storage apparatuses 7 (7a, 7b, 7c). This is because the write position management unit 3 causes the initial write position (IW) of data to differ for each storage apparatus 7.

The read unit 6 receives a read request and selects any of the storage apparatuses 7 (7a, 7b, 7c) in which data is to be mirrored, that is, one of the storage apparatuses 7 is selected on the basis of the offset information (OS). The read unit 6 instructs the selected storage apparatus 7 to read data. For example, by comparing the values of the offset information (OSa, OSb, OSc), the read unit 6 selects the storage apparatus 7a having offset information (OSa) of the smallest value as a storage apparatus from which data is to be read. In such a way, when the storage apparatus 7 having offset information (OS) of the smallest value is selected as a storage apparatus from which data is to be read, degradation of the access performance caused by conflict of access between a write request and a read request to the same storage device 8 may be inhibited. In other words, in cases where random access is performed for reading data from a storage device 8 due to a read request, the probability of conflict of access to the storage device 8 into which data is written due to a write request is related to the value of the offset information (OS).

The current write position (CWa) of the storage apparatus 7a is in the storage device 8 (SD (3)), and therefore the smaller the value of the offset information (OSa), the smaller the probability that the read position from which data is read due to a read request lies in the storage device 8 (SD (3)). Note that the same relationship applies to cases where access positions are unevenly distributed, such as cases where random access is not performed for reading data due to a read request, and many access positions lie in the vicinity of the latest written data (the current write position (CWa)).

In this way, the storage system 1 may inhibit degradation of the access performance caused by conflict between write access to the storage device 8 and read access to the storage device 8.

Second Embodiment

Next, the configuration of a storage system of a second embodiment will be described with reference to FIG. 2. FIG.

2 is a diagram illustrating an example of a configuration of the storage system of the second embodiment.

A storage system 10 is a client/server type distributed storage system. The storage system 10 includes a plurality of storage apparatuses 12 and an access distribution device (distribution device) 11 communicably connected to the storage apparatuses 12 via a network 16. The access distribution device 11 is communicably connected to a client 15 via a network 17. The access distribution device 11 receives an access request (for example, a write request, a read request, or another request) from the client 15, and forwards the received access request to the storage apparatuses 12.

For example, the storage system 10 is a storage system that records write-once workloads such as capture of packet communication, or a log-structured file system, and sequentially records data on the storage apparatuses 12. The storage system 10 performs triple mirroring in which the plurality of (for example, three) storage apparatuses 12 hold the same data.

Each storage apparatus 12 includes an access device 13 and a device enclosure 14. The access device 13 accesses the device enclosure 14 in accordance with an access request forwarded from the access distribution device 11, and sends a response to the access distribution device 11. The device enclosure 14 is made up of two or more storage devices and capable of holding data.

Figure 3:
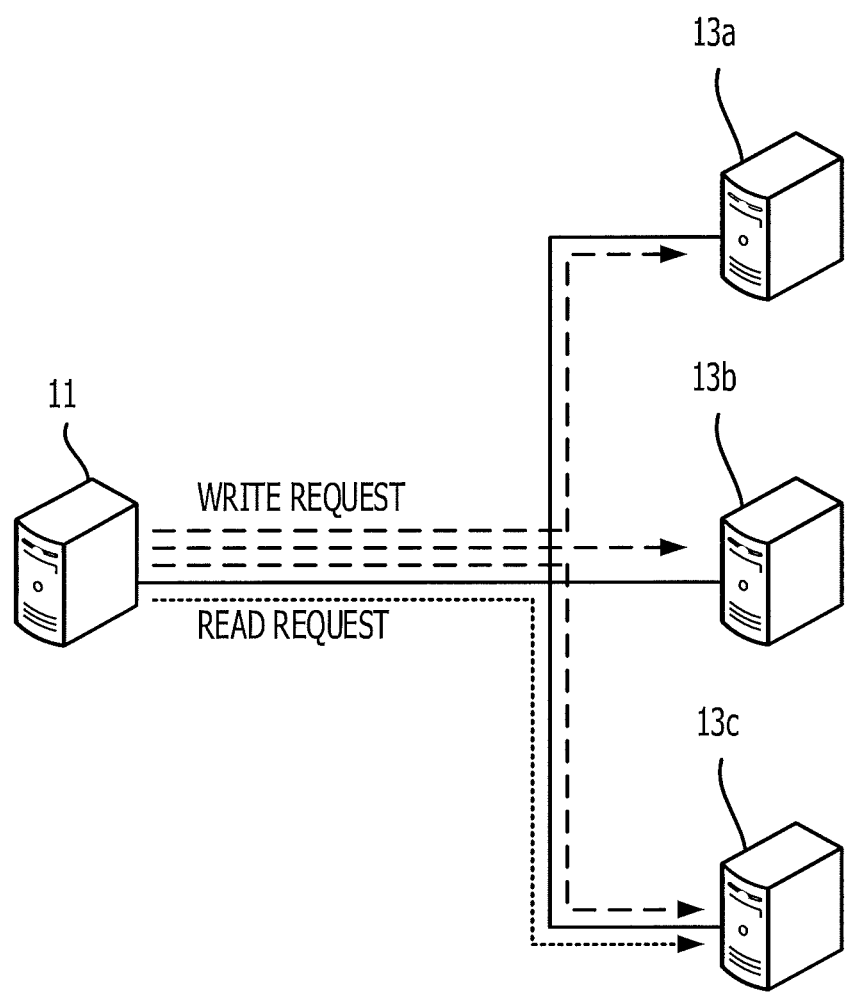
FIG. 3 is a diagram illustrating an example of an access request forwarded to access apparatuses by an access distribution device of the second embodiment.

Then, an access request forwarded to the access apparatuses 13 by the access distribution device 11 of the second embodiment will be described with reference to FIG. 3. FIG. 3 is a diagram illustrating an example of an access request forwarded to access apparatuses by an access distribution device of the second embodiment.

Upon receipt of a write request from the client 15, the access distribution device 11 instructs all the access apparatuses 13 (13a, 13b, 13c) to write data in accordance with the write request, that is, forwards the write request. Thereby, the storage system 10 performs triple mirroring in which the three storage apparatuses 12 hold the same data.

Upon receipt of a read request from the client 15, the access distribution device 11 selects one (for example, the access apparatus 13c) of the access apparatuses 13 (13a, 13b, 13c). The access distribution device 11 instructs the selected access apparatus 13 to read data, that is, forwards the read request.

At this point, if the access apparatus 13 instructed to read data is also instructed to write data, and one HDD is a common access target, there is a possibility that access conflict will occur and thus the access performance will be degraded. For this reason, the access distribution device 11 selects an access device 13 for which the possibility of access conflict is small, as a destination for forwarding a read request.

Figure 4:
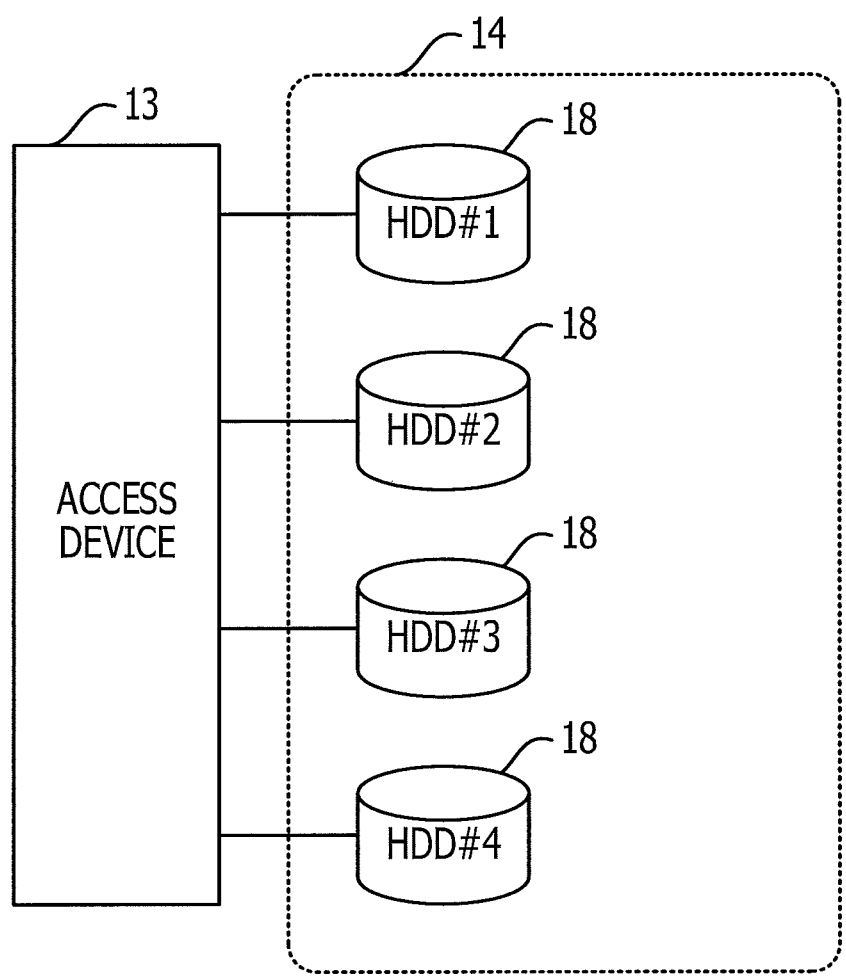
FIG. 4 is a diagram illustrating an example of connection between an access apparatus and a device enclosure of the second embodiment.

Then, the access apparatus 13 and the device enclosure 14 of the second embodiment will be described with reference to FIG. 4. FIG. 4 is a diagram illustrating an example of connection between an access apparatus and a device enclosure of the second embodiment.

The access apparatus 13 is connected to the device enclosure 14. The device enclosure 14 contains a plurality of storage devices 18. The storage device 18 is capable of recording desired information and may be, for example, an SSD other than an HDD.

FIG. 4 illustrates an example where the device enclosure 14 includes four storage devices 18 (HDD#1, HDD#2, HDD#3, HDD#4); however, any number of storage devices 18 may be included as long as the number of included storage devices 18 is two or more. Note that, hereinafter, description will be given on the assumption that the device enclosure 14 includes the four storage devices 18 (HDD#1, HDD#2, HDD#3, HDD#4) of the same storage capacity.

Figure 2:
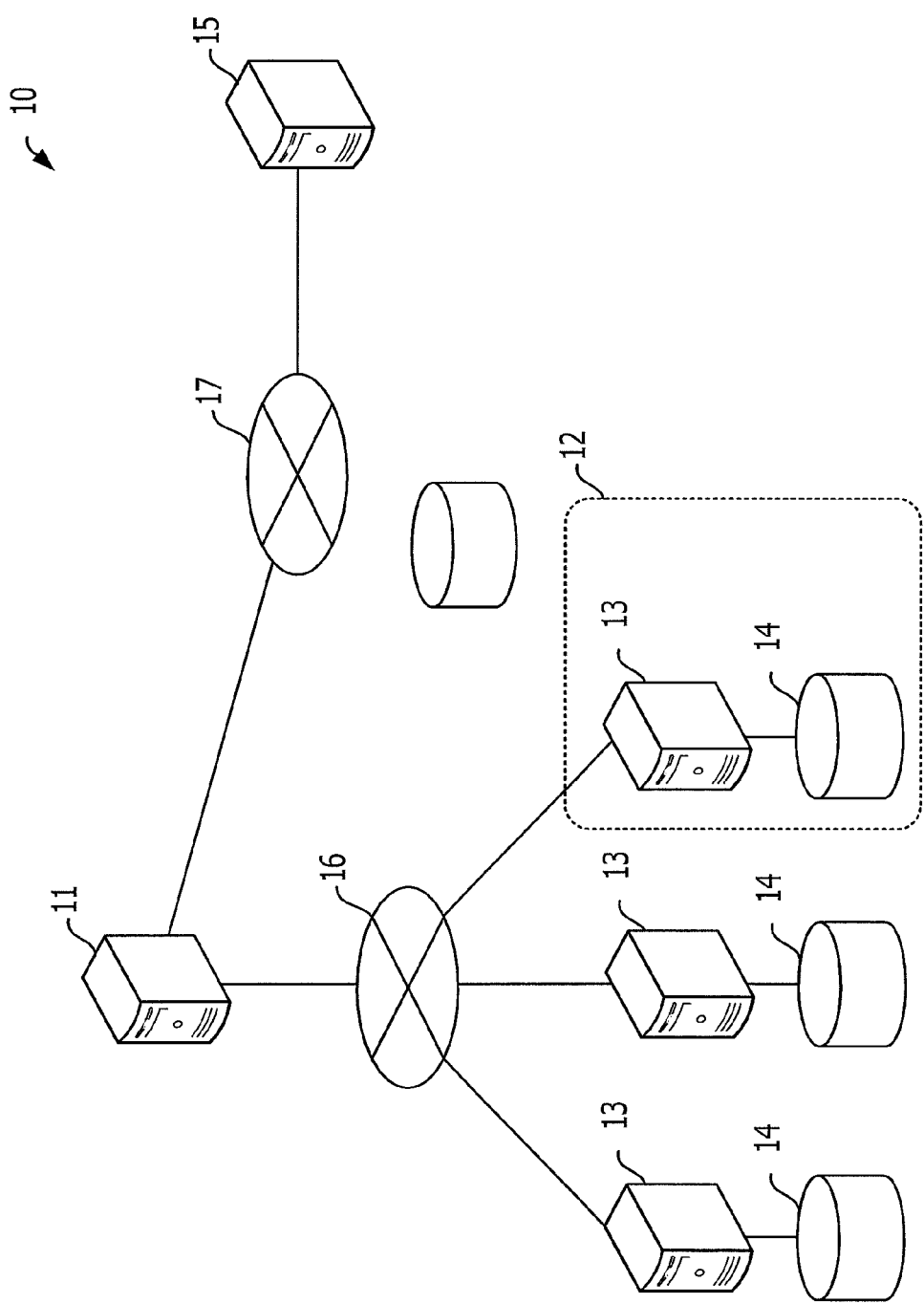
FIG. 2 is a diagram illustrating an example of a configuration of a storage system of a second embodiment.

Note that although the storage apparatus 12 in which the device enclosure 14 is externally connected to the access device 13 is illustrated in FIG. 2, the device enclosure 14 may be built in the access device 13. Also, the access device 13 may be connected to the storage devices 18 without the device enclosure 14.

Figure 5:
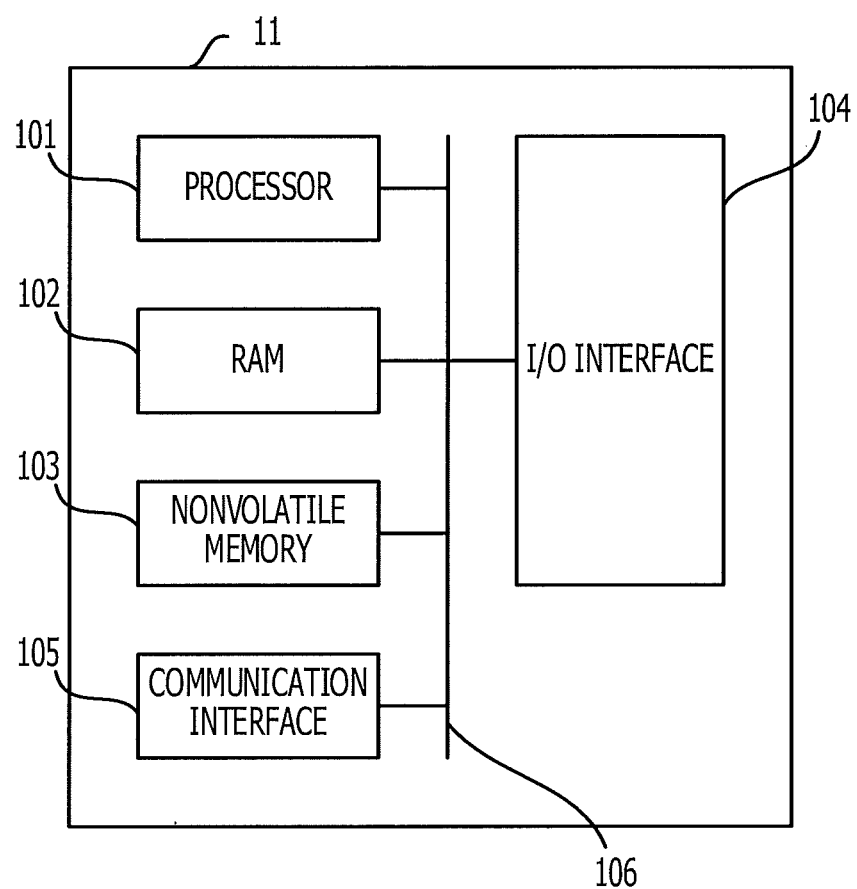
FIG. 5 is a block diagram illustrating an example of a hardware configuration of an access distribution device of the second embodiment.

Next, the hardware configuration of the access distribution device 11 of the second embodiment will be described with reference to FIG. 5. FIG. 5 is a block diagram illustrating an example of a hardware configuration of an access distribution device of the second embodiment.

The entire access distribution device 11 is controlled by a processor 101. A random access memory (RAM) 102 and a plurality of peripheral devices are connected via a bus 106 to the processor 101. The processor 101 may be a multiprocessor. The processor 101 is, for example, a central processing unit (CPU), a micro processing unit (MPU), a digital signal processor (DSP), an application specific integrated circuit (ASIC), or a programmable logic device (PLD). Also, the processor 101 may be a combination of two or more elements among a CPU, an MPU, a DSP, an ASIC, and a PLD.

The RAM 102 is used as a main memory device of the access distribution device 11. At least part of programs of an operating system, firmware, and application programs to be executed by the processor 101 is temporarily stored in the RAM 102. Also, various kinds of data used in processing (for example, management of information on system control) performed by the processor 101 are stored in the RAM 102. Also, the RAM 102 may include a cache memory different from a memory used for storage of various kinds of data.

The peripheral devices connected to the bus 106 include a nonvolatile memory 103, an input/output (I/O) interface 104, and a communication interface 105.

The nonvolatile memory 103 holds the memory contents even when the access distribution device 11 is powered off. The nonvolatile memory 103 is, for example, a semiconductor memory device such as an electrically erasable programmable read-only memory (EEPROM) or a flash memory, an HDD, or another memory. The nonvolatile memory 103 is used as an auxiliary storage of the access distribution device 11. Programs of an operating system, firmware, application programs, and various kinds of data are stored in the nonvolatile memory 103.

The I/O interface 104 is connected to input/output devices such as the storage device 18 and performs input and output.

The communication interface 105 is connected to the networks 16 and 17, and thereby sends and receives data to and from the access devices 13 and the client 15 via the networks 16 and 17.

With a hardware configuration as described above, the processing functions of the access distribution device 11 of the second embodiment may be implemented. Note that, in addition to the access distribution device 11, the access device 13, the distribution device 2 illustrated in the first embodiment, and the storage apparatus 7 may be implemented by hardware similarly to the access distribution device 11 illustrated in FIG. 5.

The access distribution device 11 and the access device 13 implement the processing functions of the second embodiment by executing a program recorded, for example, on a computer-readable recording medium. A program that describes the contents of processing performed by the access distribution device 11 and the access device 13 may be recorded on various recording media. For example, a program to be executed by the access distribution device 11 and the access device 13 may be stored in the nonvolatile memory 103. The processor 101 loads at least part of the program stored in the nonvolatile memory 103 into the RAM 102, and executes the program. Also, the program to be executed by the access distribution device 11 and the access device 13 may be recorded on portable recording media such as optical discs, a memory device, and a memory card, which are not illustrated. The optical discs include a digital versatile disc (DVD), a DVD-RAM, a compact disc read-only memory (CD-ROM), and CD-recordable (R)/rewritable (RW). The memory device is a device having a recording medium and a communication facility with the I/O interface 104 or a device connection interface, which is not illustrated. For example, the memory device is capable of writing data to a memory card or reading data from the memory card by using a memory card reader/writer. The memory card is a card type recording medium.

A program stored in a portable recording medium becomes executable after the program is installed in the nonvolatile memory 103, for example, under control of the processor 101. Also, the processor 101 may read a program directly from a portable recording medium and perform the program.

Figure 6:
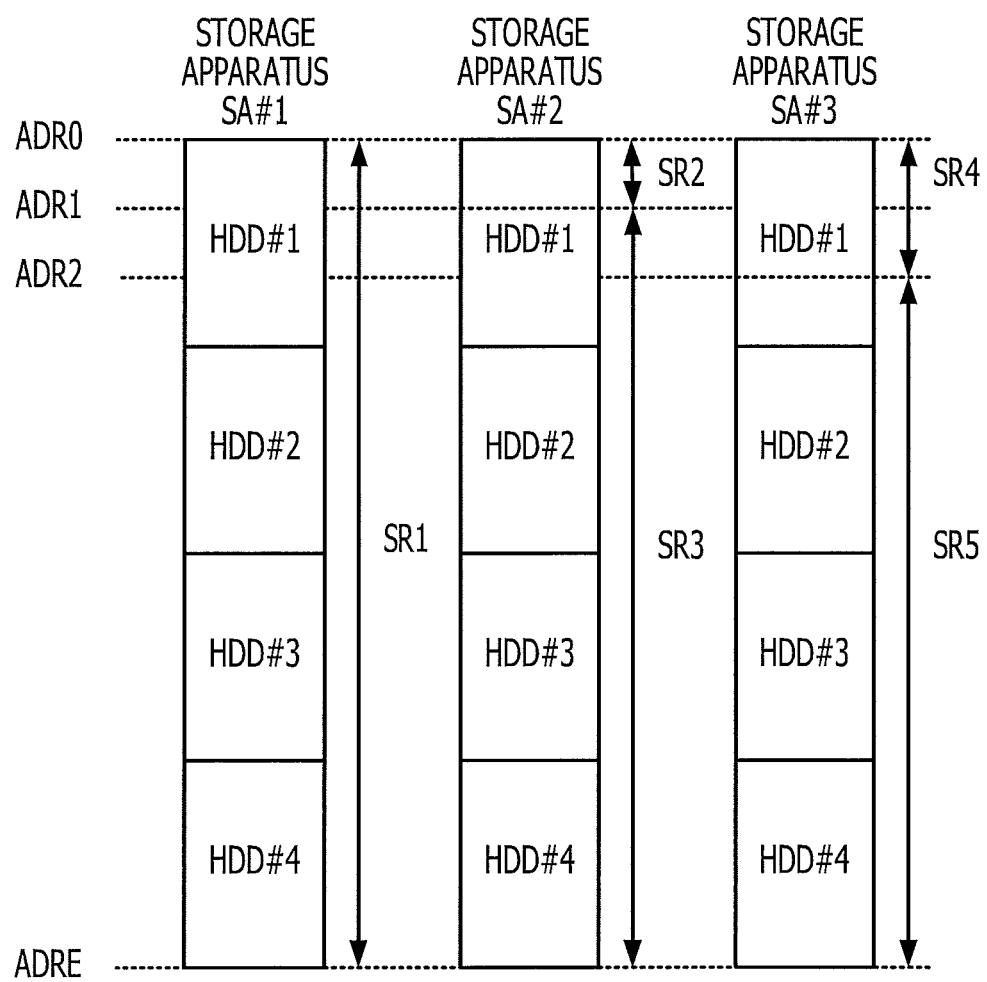
FIG. 6 is a chart illustrating an example of a storage device configuration of the second embodiment.

Then, the initial write position of the storage apparatus of the second embodiment will be described with reference to FIG. 6. FIG. 6 is a chart illustrating an example of a storage device configuration of the second embodiment.

It is assumed that the storage system 10 includes three storage apparatuses 12 (SA#1, SA#2, SA#3). Each storage apparatus 12 includes four HDDs (HDD#1, HDD#2, HDD#3, HDD#4), and sequentially writes data to the HDDs in the order of HDD#1, HDD#2, HDD#3, and HDD#4. In the storage apparatuses 12, the positions (initial write positions) at which writing of data to the HDD#1, which is the first HDD in the order of sequential writing of data, starts are addresses that differ from one another.

The storage apparatus SA#1 sequentially writes data to a region SR1 from an address ADR0 to an address ADRE, where the address ADR0 is the initial write position. The storage apparatus SA#2 sequentially writes data to a region SR3 from an address ADR1 to the address ADRE, where the address ADR1 is the initial write position. Note that, after completion of sequential writing of data in the range to the address ADRE, the storage apparatus SA#2 may sequentially write data to a region SR2 from the address ADR0 to the address ADR1. The storage apparatus SA#3 sequentially writes data to a region SR5 from an address ADR2 to the address ADRE, where the address ADR2 is the initial write position. Note that, after completion of sequential writing of data in the range to the address ADRE, the storage apparatus SA#3 may sequentially write data in a region SR4 from the address ADR0 to the address ADR2.

In this way, in the storage system 10, at the time of start of operation of the system, three storage apparatuses 12 start to write data to the HDD#1 from their respective initial write positions that differ from one another.

Note that, regarding the initial write position, given that the number of storage apparatuses 12 is Ns ($\geq 2$), and the storage capacity of the HDD is $C_{HDD}$, the initial write position (ADRi) of an i-th (i=1, 2, . . . , Ns) storage apparatus 12 may be determined as expressed by expression (1) given below.

$$ADRi=(i-1) \times C_{HDD}/Ns \qquad (1)$$

Note that it is determined that the respective initial write positions of the plurality of storage apparatuses 12 are spaced at regular intervals. This is derived from a simulation result that, in this case, the offset interval described below is optimized, so that the probability of occurrence of conflict is minimized.

Figure 7:
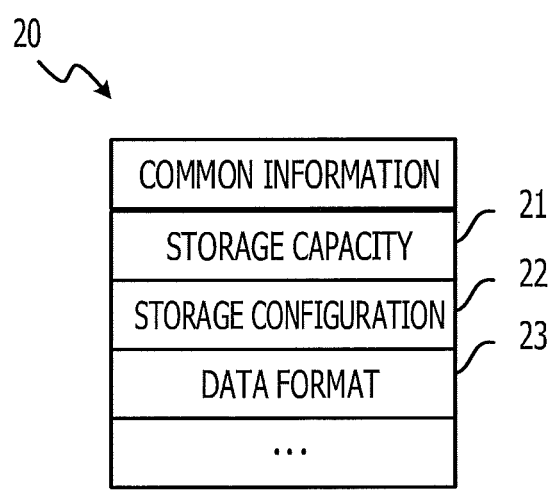
FIG. 7 is a list illustrating an example of common information that is common to storage apparatuses held by the access distribution device of the second embodiment.
Figure 9:
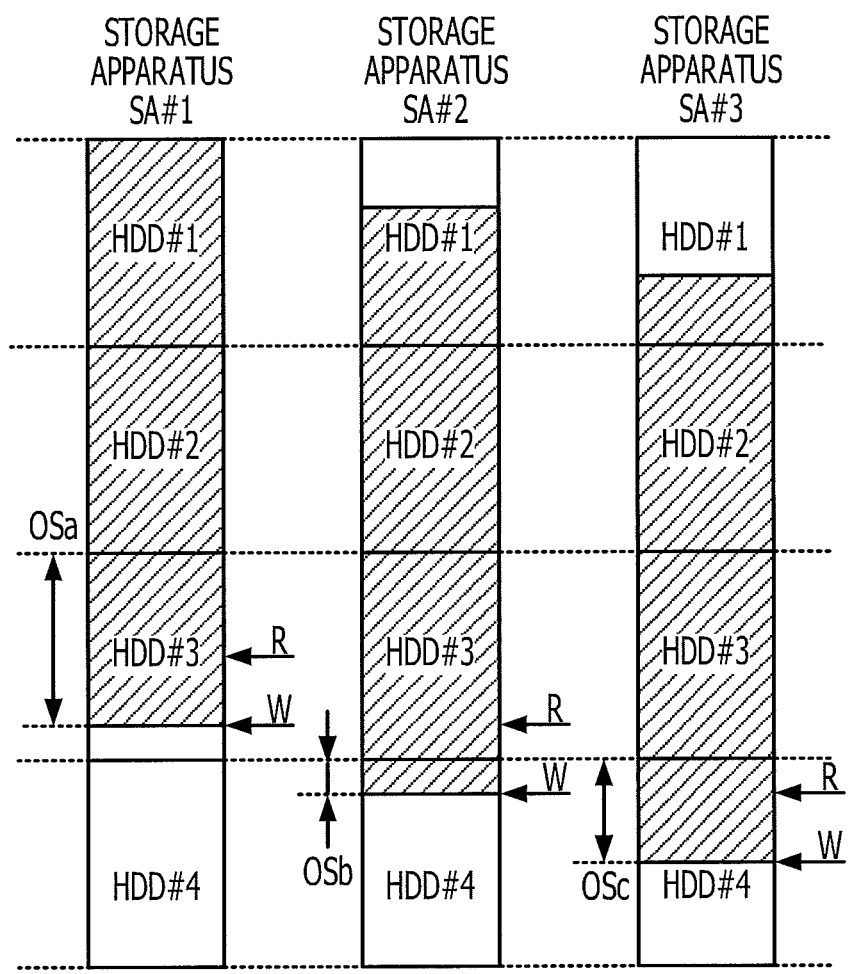
FIG. 9 is a chart illustrating an example of offset information, a write position to which data is written, and a read position from which data is read, for each storage apparatus of the second embodiment.

Then, common information that is common to the storage apparatuses 12 held by the access distribution device 11 of the second embodiment and unique information that is unique to each of the storage apparatuses 12 held by the access distribution device 11 will be described with reference to FIG. 7 to FIG. 9. First, common information that is common to the storage apparatuses 12 held by the access distribution device 11 is described with reference to FIG. 7. FIG. 7 is a list illustrating an example of common information that is common to storage apparatuses held by the access distribution device of the second embodiment.

The access distribution device 11 holds common information 20. For example, the access distribution device 11 stores the common information 20 in a storage unit (the nonvolatile memory 103 or the RAM 102) of the access distribution device 11. The common information 20 is information that is common to all the storage apparatuses 12.

The common information 20 includes at least the storage capacity 21 and may include other information such as a storage configuration 22, and a data format 23. The storage capacity 21 refers to the storage capacity of the storage device 18, which is a storage capacity common to the HDD#1, HDD#2, HDD#3, and HDD#4. The storage configuration 22 refers to the number of storage devices 18 included in the storage apparatus 12. The data format 23 refers to the format of data held by the storage device 18.

Next, the unique information that is unique to the storage apparatuses 12 held by the access distribution device 11 is described with reference to FIG. 8. FIG. 8 is a table listing an example of unique information unique to each of the storage apparatuses held by the access distribution device of the second embodiment.

The access distribution device 11 holds unique information 25. For example, the access distribution device 11 stores the unique information 25 in a storage unit (the nonvolatile memory 103 or the RAM 102) of the access distribution device 11. The unique information 25 is information that is unique to each of the storage apparatuses 12.

The unique information 25 includes at least a write starting address (initial write position) 26. For example, the write starting address 26 of the storage apparatus SA#1 is the address ADR0, the write starting address 26 of the storage apparatus SA#2 is the address ADR1, and the write starting address 26 of the storage apparatus SA#3 is the address ADR2.

Also, the access distribution device 11 holds the offset information 27 of each storage apparatus 12. For example, the access distribution device 11 stores the offset information 27 in a storage unit (the nonvolatile memory 103 or the RAM 102) of the access distribution device 11. The offset information 27 is unfixed information that changes in accordance with the current position (current write position) of writing data for each storage apparatus 12.

Here, the offset information 27 is described with reference to FIG. 9. FIG. 9 is a chart illustrating an example of offset information, a position to which data is written, and a position from which data is read, for each storage apparatus of the second embodiment.

The offset information 27 is information representing a difference between the head address of an HDD where the current data write position exists and the address of the current data write position. For example, the current data write position W of the storage apparatus SA#1 lies in the HDD#3, and the offset information 27 is OSa. The current data write position W of the storage apparatus SA#2 lies in the HDD#4, and the offset information 27 is OSb. The current data write position W of the storage apparatus SA#3 lies in the HDD#4, and the offset information 27 is OSc. The result of a comparison of the values of the offset information 27 of the storage apparatuses SA#1, SA#2, and SA#3 in the example illustrated in FIG. 9 is such that OSb<OSc<OSa.

At this point, it is assumed that the access distribution device 11 receives, from the client 15, a request for reading data. In the case of sequentially writing data such as logs, empirically in a log-structured file system, read access to new data has a higher frequency than read access to old data. Thus, many read requests require data in the vicinity of the current data write position. In the example illustrated in FIG. 9, a data read position R of the storage apparatus SA#1 lies in the HDD#3, the data read position R of the storage apparatus SA#2 lies in the HDD#3, and the data read position R of the storage apparatus SA#3 lies in the HDD#4.

In this case, in the storage apparatus SA#1, both the current data write position W and the data read position R lie in the HDD#3, and therefore access conflict occurs between writing of data and reading of data. Also, in the storage apparatus SA#3, both the current data write position W and the data read position R lie in the HDD#4, and therefore access conflict occurs between writing of data and reading of data. In contrast, in the storage apparatus SA#2, the current data write position W lies in the HDD#4 and the data read position R lies in the HDD#3, and therefore access conflict does not occur between writing of data and reading of data.

From this, the access distribution device 11 may inhibit degradation of the access performance, which is caused by access conflict in the storage system 10, by forwarding a request for reading data to the storage apparatus SA#2 whose offset information 27 has the smallest value.

Figure 10:
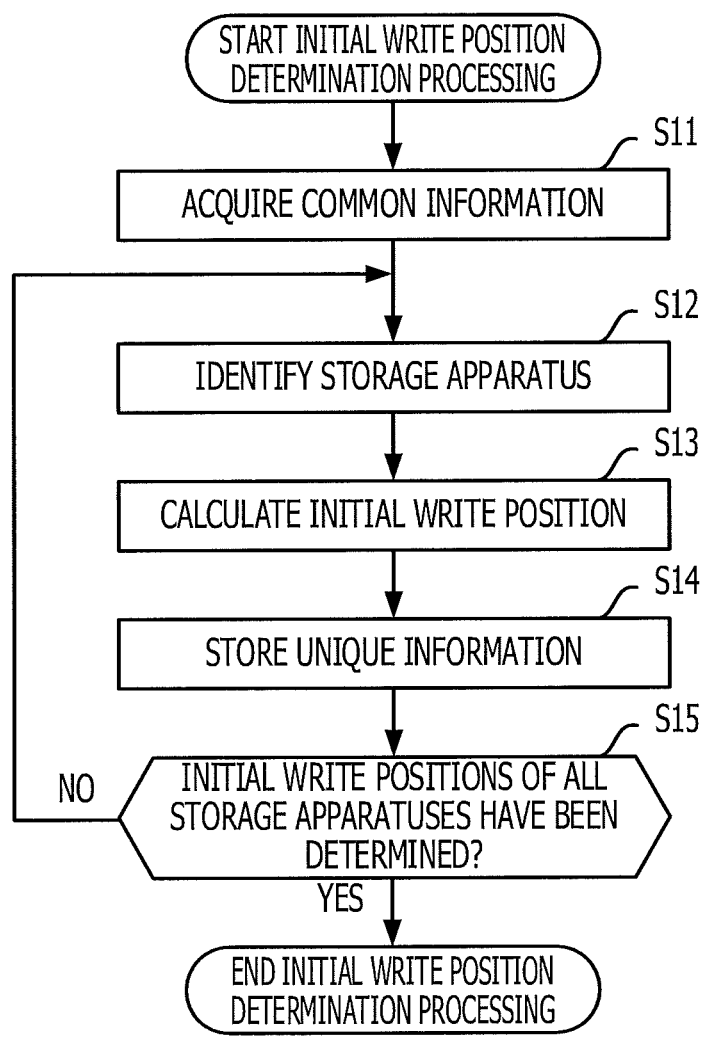
FIG. 10 is a flowchart of initial write position determination processing of the second embodiment.

Next, initial write position determination processing of the second embodiment will be described with reference to FIG. 10. FIG. 10 is a flowchart of initial write position determination processing of the second embodiment.

The initial write position determination processing is processing for determining the initial write position in each of the storage apparatuses included in the storage system 10. The initial write position determination processing is processing performed by the access distribution device 11 as one of initialization processing prior to the start of operation of the system.

(S11) A write position management unit (the processor 101) of the access distribution device 11 accesses a storage unit (the nonvolatile memory 103 or the RAM 102), and acquires the common information 20.

(S12) The write position management unit identifies a storage apparatus 12 for which an initial write position is to be determined, among all the storage apparatuses 12 included in the storage system 10.

(S13) The write position management unit calculates the initial write position of the identified storage apparatus 12. For example, the write position management unit may calculate the initial write position according to expression (1) mentioned above.

(S14) The write position management unit determines that the calculated initial write position is the initial write position of the identified storage apparatus 12, and stores the determined initial write position, as the write starting address 26 of the unique information 25, in the storage unit.

(S15) The write position management unit determines whether the initial write positions of all the storage apparatuses 12 included in the storage system 10 have been determined. If the initial write positions of all the storage apparatuses 12 have not been determined, the write position management unit proceeds to S12. If the initial write positions of all the storage apparatuses 12 have been determined, the write position management unit completes the initial write position determination processing.

Figure 11:
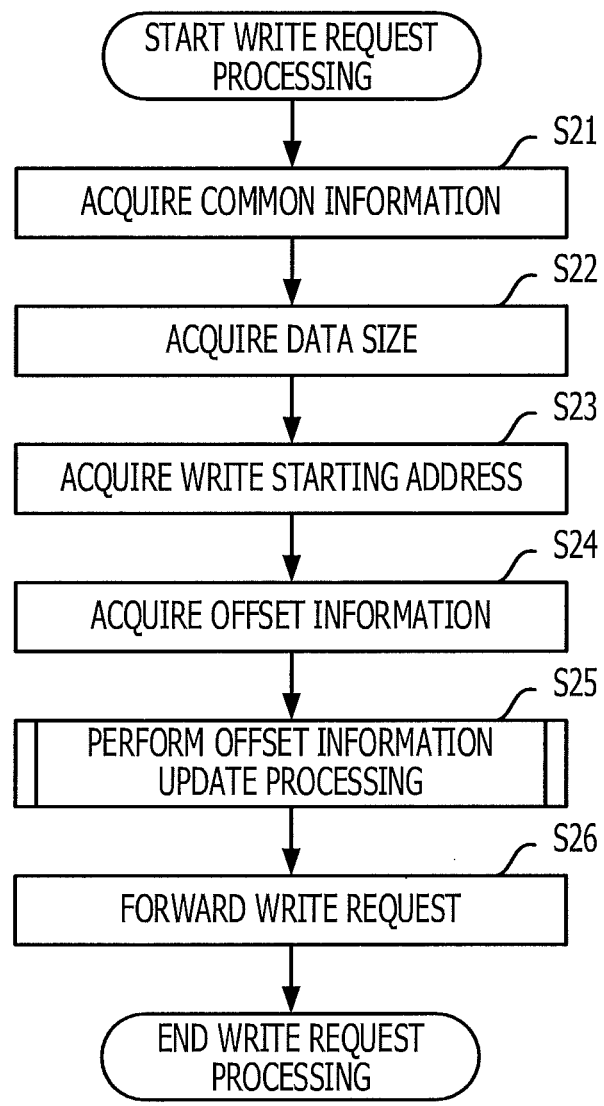
FIG. 11 is a flowchart of write request processing of the second embodiment.

Next, write request processing of the second embodiment will be described with reference to FIG. 11. FIG. 11 is a flowchart of write request processing of the second embodiment.

The write request processing is processing performed by the access distribution device 11 in response to receipt of a write request from the client 15.

(S21) A write unit (the processor 101) of the access distribution device 11 acquires the common information 20 from the storage unit (the nonvolatile memory 103 or the RAM 102).

(S22) The write unit acquires, from the write request, the size of data to be written.

(S23) The write unit acquires, from the storage unit, the write starting address 26 which is the unique information 25 for all the storage apparatuses 12 included in the storage system 10.

(S24) The write unit acquires, from the storage unit, the offset information 27 for all the storage apparatuses 12 included in the storage system 10.

(S25) An offset management unit (processor 101) of the access distribution device 11 performs offset information update processing. The offset information update processing is processing for updating the offset information 27 for all the storage apparatuses 12 included in the storage system 10. The offset information update processing will be described later with reference to FIG. 12.

(S26) The write unit forwards the write request received from the client 15 to all the storage apparatuses 12 included in the storage system 10, and completes the write request processing.

Figure 12:
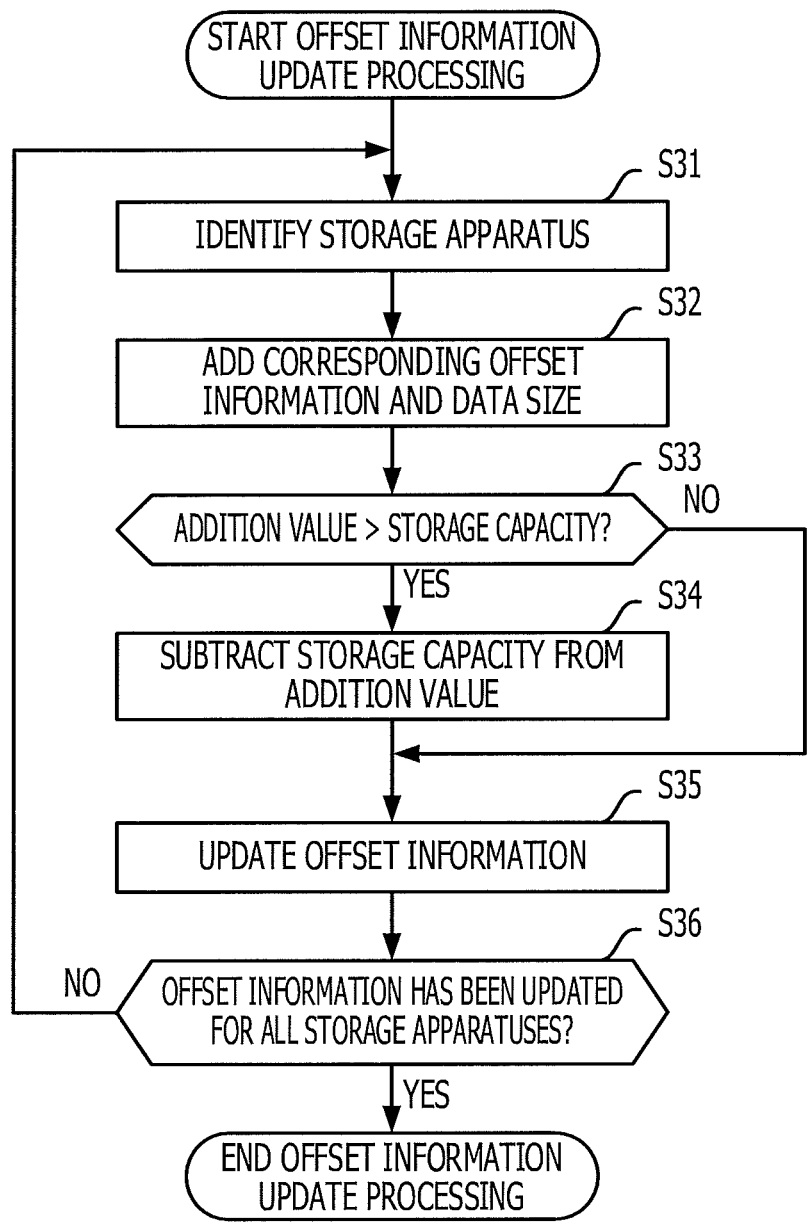
FIG. 12 is a flowchart of offset information update processing of the second embodiment.

Next, the offset information update processing of the second embodiment will be described with reference to FIG. 12. FIG. 12 is a flowchart of offset information update processing of the second embodiment.

The offset information update processing is processing performed by the offset management unit in S25 of the write request processing.

(S31) The offset management unit identifies a storage apparatus 12 whose offset information is to be updated, among all the storage apparatuses 12 included in the storage system 10.

(S32) The offset management unit adds the data size acquired in S22 of the write request processing to the offset information 27 corresponding to the identified storage apparatus 12. Note that the data size to be added is dependent on the format in which data is held in an HDD. For this reason, the data size to be added is a data size after the data to be written is converted to a desired format. For example, when the format in which data is held in an HDD is a format in which a header of a fixed length is added before data, the sum of the data size of data to be written and the data size of the header is a data size to be added.

(S33) The offset management unit compares the addition value (addition result) with the storage capacity 21 (the common information 20) acquired in S21 of the write request processing. The offset management unit proceeds to S34 if the addition value exceeds the storage capacity 21, and proceeds to S35 if the addition value does not exceed the storage capacity 21.

(S34) The offset management unit subtracts the storage capacity 21 from the addition value.

(S35) The offset management unit updates the offset information 27 by setting the calculation result as new offset information 27.

(S36) The offset management unit determines whether the offset information 27 has been updated for all the storage apparatuses 12 included in the storage system 10. If the offset information 27 has not been updated for all the storage apparatuses 12, the offset management unit proceeds to S31. If the offset information 27 has been updated for all the storage apparatuses 12, the offset management unit completes the offset information update processing.

Figure 13:
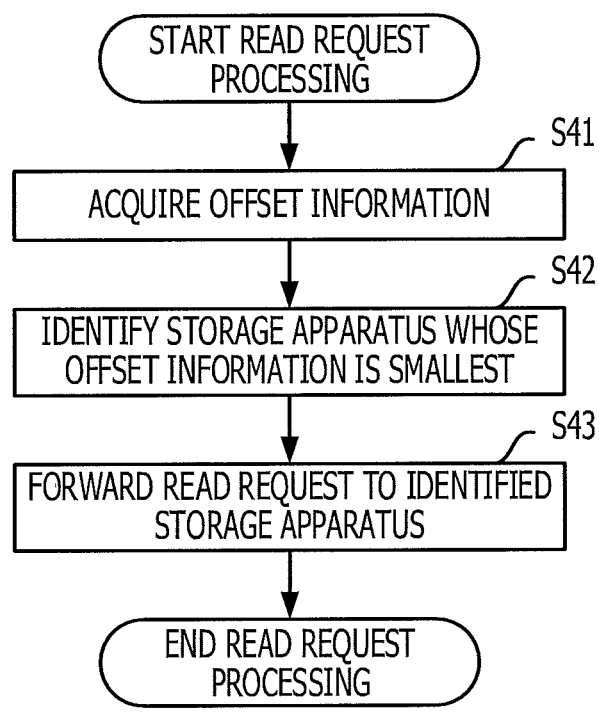
FIG. 13 is a flowchart of read request processing of the second embodiment.

Next, read request processing of the second embodiment will be described with reference to FIG. 13. FIG. 13 is a flowchart of read request processing of the second embodiment.

The read request processing is processing performed by the access distribution device 11 in response to receipt of a read request from the client 15.

(S41) The read unit (the processor 101) of the access distribution device 11 acquires the offset information 27 from the storage unit.

(S42) The read unit identifies a storage apparatus 12 whose offset information 27 is smallest among all the storage apparatuses 12 included in the storage system 10.

(S43) The read unit forwards the read request received from the client 15 to the identified storage apparatus 12, and completes the read request processing.

In this way, since the access distribution device 11 determines the destination to which a read request is to be forwarded, the access distribution device 11 may reduce the probability that conflict between a write request and a read request will occur in one storage device 18 of one storage apparatus 12. Thereby, the storage system 10 may inhibit degradation of the access performance caused by access conflict.

Next, effects of inhibiting degradation of the access performance caused by access conflict in the storage system 10 of the second embodiment will be described.

The number of the storage apparatuses 12 is denoted by Ns (≥2), the number of HDDs of each storage apparatus 12 is denoted by $N_{HDD}$, and the storage capacity of the HDD is denoted by $C_{HDD}$. Here, in view of the empirical fact that newer data is accessed at a high frequency in a log-structured file system, it is assumed that the range of data to be read is a range of one half the data size stored in the storage apparatus 12 from the current data write position W. The range of data to be read, that is, the target range TS(R) of a read request is expressed by expression (2) given below.

$$TS(R)=(N_{HDD} \times C_{HDD})/2 \qquad (2)$$

When a read request occurs with a uniform probability in the target range TS(R) of the read request, an average access conflict probability CP1 that a write request and a read request will be granted access to the same HDD is expressed by expression (3) given below.

$$CP1=1/(N_{HDD} \times Ns) \qquad (3)$$

In contrast, when the initial write position does not vary for each storage apparatus 12, an average access conflict probability CP2 that a write request and a read request will be granted access to the same HDD is expressed by expression (4) given below.

$$CP2=1/N_{HDD} \qquad (4)$$

Figure 14:
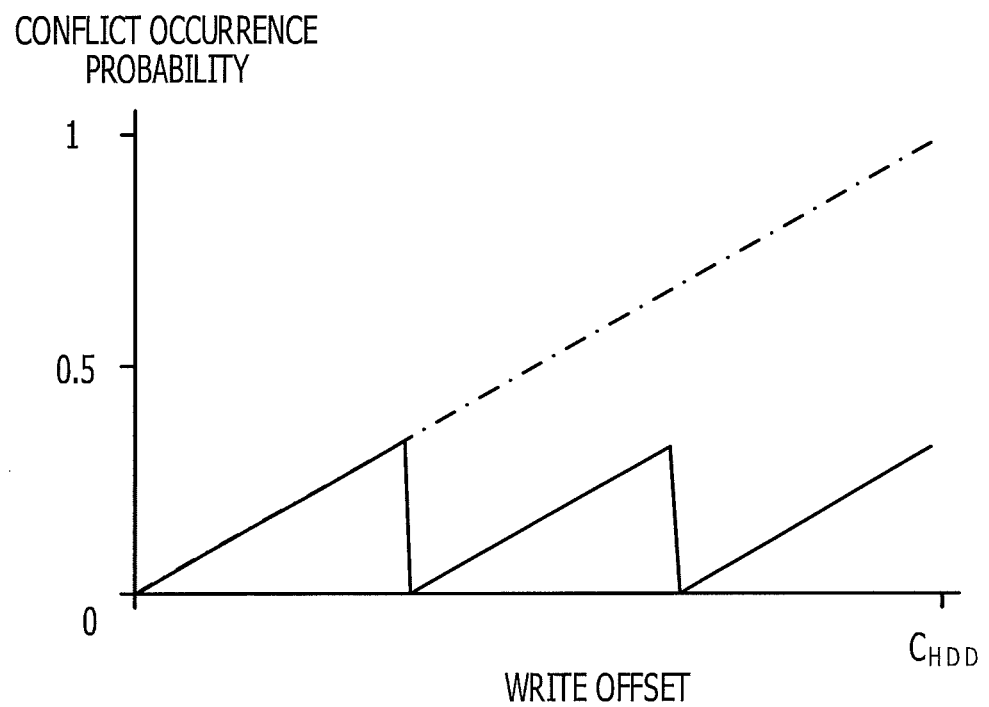
FIG. 14 is a graph illustrating the relationship between the offset information and the conflict occurrence probability of the second embodiment.

The simulation result of the probability of access conflict of the storage apparatus SA#1 in the case where the number of the storage apparatuses 12 is set as Ns=3, and the number of HDDs of each storage apparatus 12 is set as $N_{HDD}$=2 is illustrated in FIG. 14. FIG. 14 is a graph illustrating the relationship between the offset information and the conflict occurrence probability of the second embodiment.

In the storage system 10, since the access distribution device 11 determines, on the basis of the offset information 27, the destination to which a read request is to be forwarded, the access conflict probability has a shape of the saw teeth as plotted by a solid line. In contrast, when the initial write position does not vary for storage apparatuses 12, the access conflict probability monotonously increases as plotted by a dot-and-dash line.

In this way, the storage system 10 may reduce the access conflict probability. Accordingly, the storage system 10 may inhibit degradation of the access performance caused by access conflict. Additionally, the storage system 10 does not have to include a cache memory in advance even for the case where generation of a read request is uncertain. This provides a significant advantage for system construction.

Third Embodiment

A storage system of a third embodiment will be described next. The storage system of the third embodiment differs from the storage system of the second embodiment in that an access distribution device of the third embodiment includes a cache memory.

Figure 15:
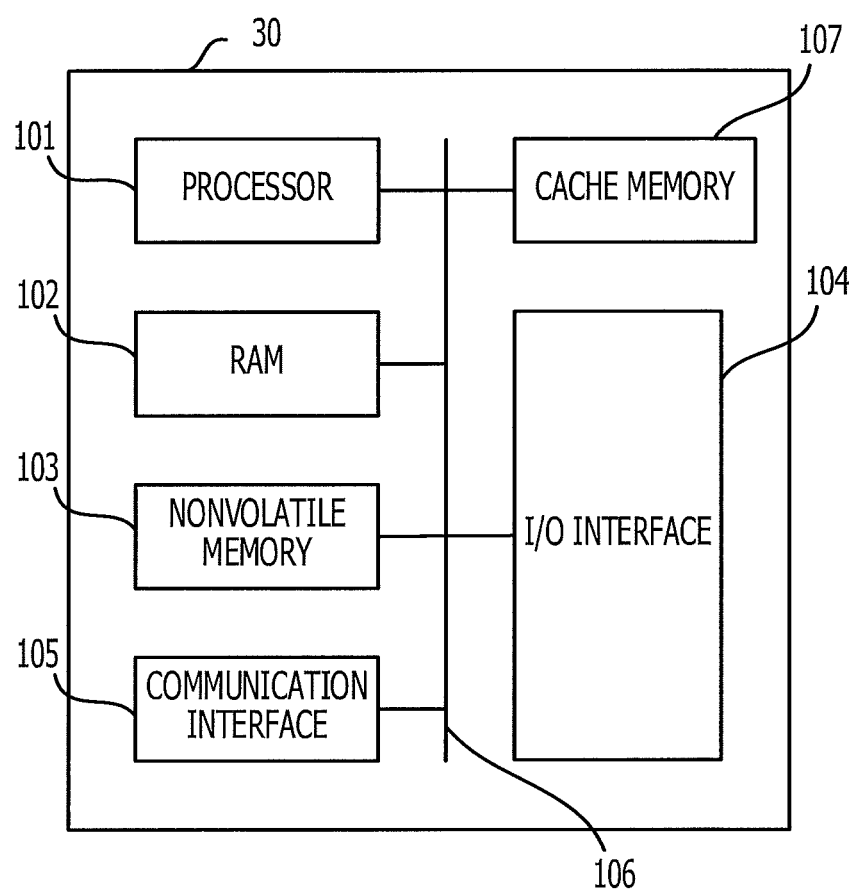
FIG. 15 is a block diagram illustrating an example of a hardware configuration of an access distribution device of a third embodiment.

First, the access distribution device of the third embodiment will be described with reference to FIG. 15. FIG. 15 is a block diagram illustrating an example of the hardware configuration of the access distribution device of the third embodiment. Note that elements having the same configuration as in the second embodiment are denoted by the same reference numerals, and will not be further described.

An access distribution device 30 includes a cache memory 107 in addition to the configuration included in the access distribution device 11 of the second embodiment. The cache memory 107 holds data for which the latest write request is made, within the range of the storage capacity of the cache memory 107. Note that the storage capacity of the cache memory 107 may be regarded as one piece of the common information 20.

Figure 16:
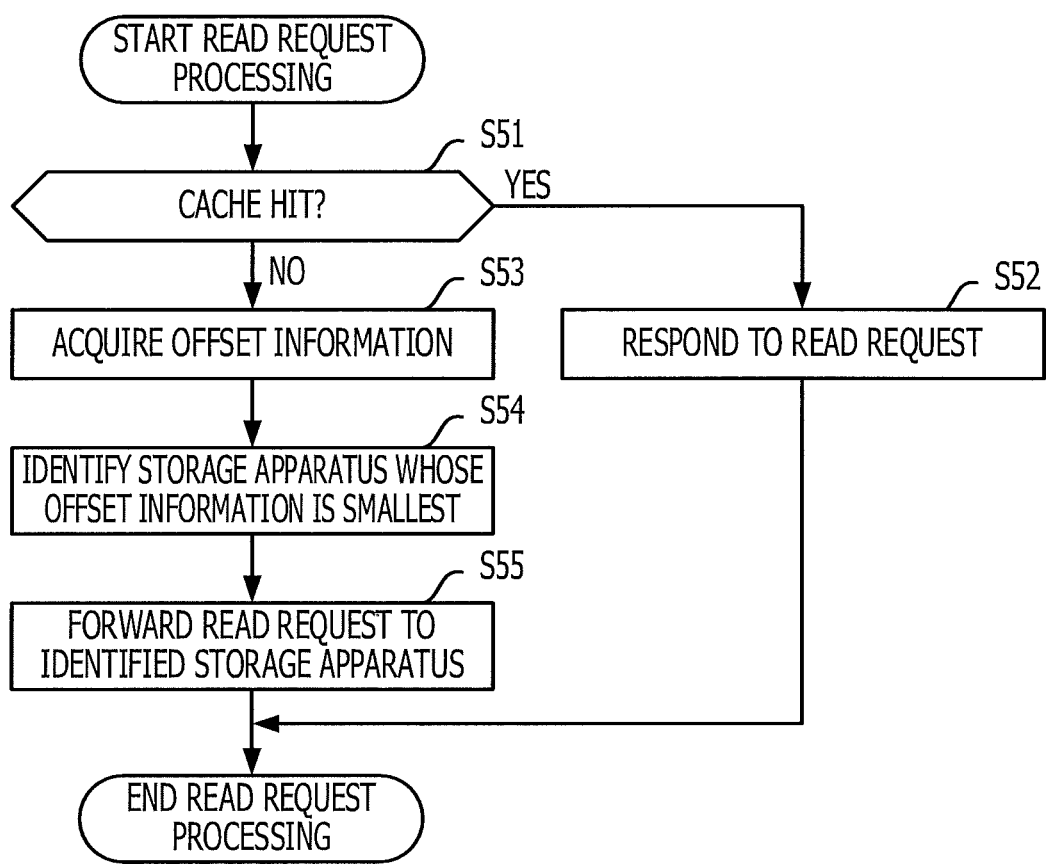
FIG. 16 is a flowchart of read request processing of the third embodiment.

Next, read request processing of the third embodiment will be described with reference to FIG. 16. FIG. 16 is a flowchart of read request processing of the third embodiment.

The read request processing is processing performed by the access distribution device 30 in response to receipt of a read request from the client 15.

(S51) The read unit (the processor 101) of the access distribution device 30 determines whether the cache memory 107 holds (cache hit) the target data of the read request. The read unit proceeds to S52 if a cache hit occurs, and proceeds to S53 if a cache miss occurs.

(S52) The read unit reads the target data of the read request from the cache memory 107, responds to the read request of the client 15, and terminates the read request processing.

(S53) The read unit acquires the offset information 27 from the storage unit.

(S54) The read unit identifies a storage apparatus 12 whose offset information 27 is smallest among all the storage apparatuses 12 included in the storage system 10.

(S55) The read unit forwards the read request received from the client 15 to the identified storage apparatus 12, and completes the read request processing.

In this way, since the access distribution device 30 determines the destination to which a read request is to be forwarded, the access distribution device 30 may reduce the probability that conflict between a write request and a read request will occur in one storage device 18 of one storage apparatus 12. Thereby, the storage system 10 may inhibit degradation of the access performance caused by access conflict. Additionally, the access distribution device 30 may improve the access performance by using the cache memory 107.

Next, effects of inhibiting degradation of the access performance caused by access conflict in the storage system 10 of the third embodiment will be described.

The number of the storage apparatuses 12 is denoted by Ns (≥2), the number of HDDs of each storage apparatus 12 is denoted by $N_{HDD}$, the storage capacity of the HDD is denoted by $C_{HDD}$, and the storage capacity of the cache memory 107 is denoted by $C_{CACHE}$. Here, in view of the empirical fact that newer data is accessed at a high frequency in a log-structured file system, it is assumed that the range of data to be read is a range of one half the data size stored in the storage apparatus 12 from the current data write position W. Data to be read, that is, data that lies in a range of $C_{CACHE}$ from the current data write position W within the target range TS(R) of the read request expressed by expression (2) is read by accessing the cache memory 107 instead of accessing an HDD.

When a read request occurs with a uniform probability for the target range TS(R) of the read request, an average access conflict probability CP3 that a write request and a read request will be granted access to the same HDD is expressed by expression (5) given below.

If $C_{CACHE} < (C_{HDD}/Ns)$,

CP3={1/($N_{HDD}$×Ns)}×[1−{$C_{CACHE}$×Ns)/$C_{HDD}$)}]²

If $C_{CACHE} ≥ (C_{HDD}/Ns)$, CP3=0     (5)

In contrast, when the initial write position does not vary for each storage apparatus 12, an average access conflict probability CP4 that a write request and a read request will be granted access to the same HDD is expressed by expression (6) given below.

CP4=(1/$N_{HDD}$)×{1−($C_{CACHE}/C_{HDD}$)}2     (6)

Figure 17:
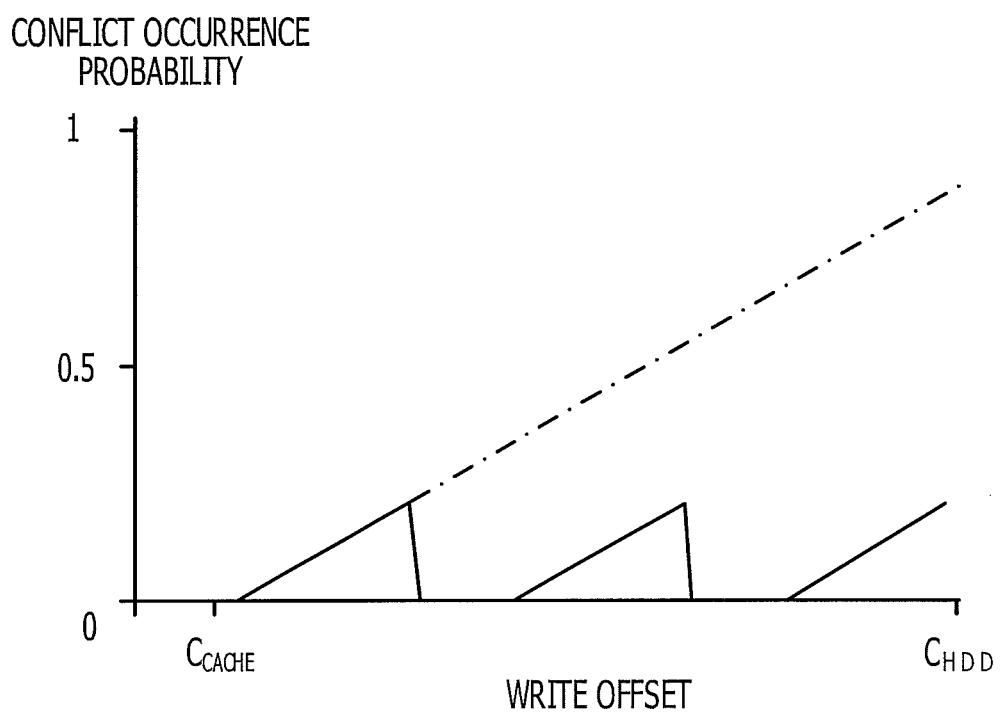
FIG. 17 is a graph illustrating the relationship between the offset information and the conflict occurrence probability of the third embodiment.

The simulation result of the probability of access conflict of the storage apparatus SA#1 in the case where the number of the storage apparatuses 12 is set as Ns=3, the number of HDDs of each storage apparatus 12 is set as $N_{HDD}$=2, and the storage capacity of the cache memory 107 is set as $C_{CACHE}=C_{HDD}$/10 is illustrated in FIG. 17. FIG. 17 is a graph illustrating the relationship between the offset information and the conflict occurrence probability of the third embodiment.

In the storage system 10, since, upon a cache miss, the access distribution device 30 determines, on the basis of the offset information 27, a destination to which a read request is to be forwarded, the access conflict probability has a shape of the saw teeth in which a cache hit and a cache miss are repeated as plotted by a solid line. In contrast, when the initial write position does not vary for each storage apparatus 12, a cache hit occurs in a range of $C_{CACHE}$, and, after occurrence of a cache miss, the access conflict probability monotonously increases as plotted by a dot-and-dash line.

In this way, the storage system 10 may reduce the access conflict probability. Accordingly, the storage system 10 may inhibit degradation of the access performance caused by access conflict. Additionally, the storage system 10 does not have to excessively include a cache memory in advance even for the case where generation of a read request is uncertain. This provides a significant advantage for system construction.

Note that although, in the storage system 10, all the storage apparatuses 12 include the same number of the storage devices 18 having the same storage capacity, the present disclosure may be applied to a storage system in which the configuration of the storage devices 18 differs for each storage apparatus 12. For example, if HDDs (HDD#1, HDD#2, HDD#3, HDD#4) have different storage capacities, the central value, such as mean, median, or mode, may be adopted as the storage capacity of the HDDs for $C_{HDD}$. The storage system 10 may calculate initial write positions using such $C_{HDD}$.

Even in such a case, as compared with the case where the initial write position does not vary for each storage apparatus 12, the storage system 10 may probabilistically reduce the access conflict probability.

Note that the processing functions described above may be implemented by a computer. In that case, a program that describes the contents of processing of the functions that the distribution device 2, 11, or 30, the storage apparatus 12, and the access device 13 are to have is provided. The program is executed by the computer, so that the processing functions described above are implemented on the computer. The program that describes the contents of processing may be recorded on a recording medium that is readable by a computer. Computer-readable recording media include magnetic memory devices, optical discs, magneto optical recording media, semiconductor memories, and so on. The magnetic memory devices include an HDD, a flexible disk (FD), a magnetic tape, and so on. The optical discs include a DVD, a DVD-RAM, a CD-ROM/RW, and so on. The magneto optical recording media include a magneto-optical disk (MO) and so on.

In cases where a program is circulated, portable recording media such as DVDs and CD-ROMs on which the program is recorded are sold, for example. Also, a program may be stored in a storage device of a server computer, and be transferred from the server computer via a network to other computers.

A computer for executing a program causes a program recorded on a portable recording medium or a program transferred from a server computer, for example, to be stored in a storage device of the computer. Then, the computer reads the program from the storage device thereof, and performs processing in accordance with the program. Note that the computer may also read the program directly from the portable recording medium, and perform processing in accordance with the program. Additionally, each time a program is transferred from a server computer connected via a network to a computer, the computer may perform processing in accordance with the received program.

Additionally, at least part of the processing functions described above may be implemented using electronic circuits, such as a DSP, an ASIC, and a PLD.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage system comprising:
a plurality of storage apparatuses each including
a plurality of storage devices on which data is sequentially recorded in accordance with a write position indicating where the data is to be written; and a distribution device configured to distribute a request to the plurality of storage apparatuses, the distribution device including
a processor configured to
manage an initial write position and a current write position for each of the plurality of storage apparatuses, the current write position indicating a position where data is to be currently written, the initial write position indicating an initial position of the current write position, the initial write position varying for the plurality of storage apparatuses,
receive a write request and give an instruction for writing data to each of the plurality of storage apparatuses in accordance with the current write position by distributing the write request to each of the plurality of storage apparatuses,
manage offset information indicating a write position relative to a top of a storage device corresponding to the current write position for each of the plurality of storage apparatuses, and
receive a read request and select, based on the offset information, one of the plurality of storage apparatuses so as to send the read request to the selected storage apparatus.

2. The storage system according to claim 1, wherein each of the plurality of storage apparatuses includes a same number of storage devices each having a same storage capacity.

3. The storage system according to claim 2, wherein the initial write positions of the plurality of storage apparatuses are spaced at regular intervals.

4. The storage system according to claim 3, wherein each of the regular intervals is an interval obtained by dividing the same storage capacity by the same number.

5. The storage system according to claim 1, wherein the processor is configured to
select a storage apparatus whose offset information has a smallest value among offset information of the plurality of storage apparatuses.

6. The storage system according to claim 1, wherein the distribution device further includes
a cache memory configured to hold data to be written in accordance with the write request, and
the processor is configured to
perform the selection if data to be read in accordance with the read request is not held in the cache memory.

7. A non-transitory computer-readable recording medium having stored therein a program for causing a computer to execute a process, the process comprising:
managing an initial write position and a current write position for each of a plurality of storage apparatuses, the current write position indicating a position where data is to be currently written, the initial write position indicating an initial position of the current write position, the initial write position varying for the plurality of storage apparatuses;
receiving a write request and giving an instruction for writing data to each of the plurality of storage apparatuses in accordance with the current write position by distributing the write request to each of the plurality of storage apparatuses;
managing offset information indicating a write position relative to a top of a storage device corresponding to the current write position for each of the plurality of storage apparatuses; and
receiving a read request and selecting, based on the offset information, one of the plurality of storage apparatuses so as to send the read request to the selected storage apparatus.

8. A method for managing storage apparatuses, the method comprising:
managing, by a distribution device, an initial write position and a current write position for each of a plurality of storage apparatuses, the current write position indicating a position where data is to be currently written, the initial write position indicating an initial position of the current write position, the initial write position varying for the plurality of storage apparatuses;
receiving a write request and giving an instruction for writing data to each of the plurality of storage apparatuses in accordance with the current write position by distributing the write request to each of the plurality of storage apparatuses;
managing offset information indicating a write position relative to a top of a storage device corresponding to the current write position for each of the plurality of storage apparatuses; and
receiving a read request and selecting, based on the offset information, one of the plurality of storage apparatuses so as to send the read request to the selected storage apparatus.

* * * * *